United States Patent
Gong et al.

(10) Patent No.: US 8,284,838 B2
(45) Date of Patent: Oct. 9, 2012

(54) APPARATUS AND RELATED METHOD FOR DECODING VIDEO BLOCKS IN VIDEO PICTURES

(75) Inventors: Jin-Sheng Gong, Hsinchu (TW);
Kuo-Hua Yu, Hsinchu County (TW);
Yu-Teng Lin, Hsinchu County (TW);
Hsiao-Jen Weng, Taipei (TW);
Kun-Wei Wang, Taipei County (TW)

(73) Assignee: Realtek Semiconductor Corp., Hsinchu (TW)

( * ) Notice: Subject to any disclaimer, the term of this patent is extended or adjusted under 35 U.S.C. 154(b) by 1114 days.

(21) Appl. No.: 11/964,722

(22) Filed: Dec. 27, 2007

(65) Prior Publication Data
US 2008/0159399 A1    Jul. 3, 2008

(30) Foreign Application Priority Data

Dec. 27, 2006    (TW) ................................ 95149276 A

(51) Int. Cl.
*H04N 7/12*    (2006.01)

(52) U.S. Cl. .................................................. 375/240.16

(58) Field of Classification Search ............. 375/240.16
See application file for complete search history.

(56) References Cited

U.S. PATENT DOCUMENTS

| | | | |
|---|---|---|---|
| 6,385,245 B1 * | 5/2002 | De Haan et al. ......... | 375/240.16 |
| 6,442,204 B1 | 8/2002 | Snook | |
| 6,608,937 B1 | 8/2003 | Snook | |
| 6,690,728 B1 * | 2/2004 | Chang et al. ............. | 375/240.16 |
| 2002/0080874 A1 | 6/2002 | Wilson | |
| 2006/0159176 A1 | 7/2006 | Park | |
| 2007/0064805 A1 * | 3/2007 | Carrig et al. ............. | 375/240.16 |

FOREIGN PATENT DOCUMENTS

| | | |
|---|---|---|
| CN | 1976467 A | 6/2007 |
| EP | 0 577 365 A2 | 1/1994 |
| WO | 9907159 | 2/1999 |

* cited by examiner

*Primary Examiner* — Mark Rinehart
*Assistant Examiner* — Matthew Hopkins
(74) *Attorney, Agent, or Firm* — Thomas, Kayden, Horstemeyer & Risley, LLP

(57) ABSTRACT

A method for decoding a video block in a video picture includes: selecting N motion vectors from M motion vector, wherein the M motion vectors corresponding to at least a video block of at least a reference area; and decoding the video block according to the N motion vectors.

23 Claims, 2 Drawing Sheets

APPARATUS AND RELATED METHOD FOR DECODING VIDEO BLOCKS IN VIDEO PICTURES

BACKGROUND OF THE INVENTION

1. Field of the Invention

The present invention relates to a method for decoding video blocks in video pictures, and more particularly, to an apparatus and related method for decoding a video block by selecting N motion vectors from M motion vectors, the M motion vectors corresponding to at least a video block of at least a reference area 2. Description of the Prior Art In video decoding, taking the MPEG (Moving Picture Coding Experts Group) specification as an example, the encoding methods of a video picture include intra coding, predictive coding and bi-directionally predictive coding. An intra picture (I picture) is a video picture encoded independently, i.e. one that can be decoded directly without referencing any previous video picture or future video picture during the video decoding process. A predictive picture (P picture) is a video picture whose decoding process needs to reference a previous video picture in the temporal domain, such as an intra picture or a predictive picture. Additionally, a bi-directionally predictive picture (B picture) is a video picture whose decoding process needs to reference both a previous video picture and a future video picture in the temporal domain.

Because the video pictures referenced when decoding predictive pictures or bi-directionally predictive pictures are buffered in the memory, a huge amount of video picture data may be accessed when video decoding is performed upon a group of macroblocks. In a worst case, if all macroblocks in a bi-directionally predictive picture need to reference both previous and future video pictures when being decoded, required reference video blocks must be read from the memory for motion compensation. The over-consumption of the memory bandwidth will degrade the overall system performance.

To solve the above problems, conventional schemes mainly focus on the influences caused by macroblock decoding requiring both previous and future video pictures. One conventional scheme modifies the decoding of a macroblock that needs to reference both previous and future video pictures so it only references one of the video pictures. Regarding the worst case, each macroblock of a bi-directionally predictive picture should have two motion vectors originally, which are respectively corresponding to a previous reference video block and a future reference video block used for motion compensation; however, after employing the above conventional scheme, the decoding of each macroblock uses only one motion vector corresponding to either the previous video block or the future video block. Even though the conventional scheme can decrease the decoding accuracy of the video picture and influence the final video quality, it can greatly alleviate the bandwidth consumption problem of the memory.

For the current video block to be decoded, when selecting one of the two reference video blocks to be used for motion compensation, the conventional scheme compares time intervals between the current video block to be decoded and two reference video blocks in order to make the decision. For instance, when the time interval between a previous reference video block and the current video block to be decoded is shorter than that between a future reference video block and the current video block to be decoded, only the motion vector corresponding to the previous reference video block is reserved. That is, the previous reference video block is deemed more accurate than the future reference video block. The drawback of the conventional scheme is that the reference video block having a shorter time interval from the current video block to be decoded is not guaranteed to have higher picture accuracy. Thus, the present invention proposes a decoding scheme that can solve the problem of bandwidth over-consumption and offer higher picture accuracy at the same time.

SUMMARY OF THE INVENTION

One objective of the present invention is to provide an apparatus and a method for decoding a video block, where the apparatus and method select N motion vectors from M motion vectors, wherein the M motion vectors corresponding to at least a video block of at least a reference area to solve the above problem.

According to an exemplary embodiment of the present invention, a method for decoding a video block in a video picture is disclosed. The method includes: selecting N motion vectors from M motion vectors, wherein the M motion vectors corresponding to at least a video block of at least a reference area; and decoding the video block according to the N motion vectors.

According to the exemplary embodiment of the present invention, another method for decoding a video block in a video picture is further disclosed. The method includes: determining if a plurality of reference video pictures, referred to by M motion vectors corresponding to the video block, include at least an intra picture; and when the reference video pictures include at least an intra picture, selecting motion vectors produced by one intra picture of the reference video pictures to decode the video block.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
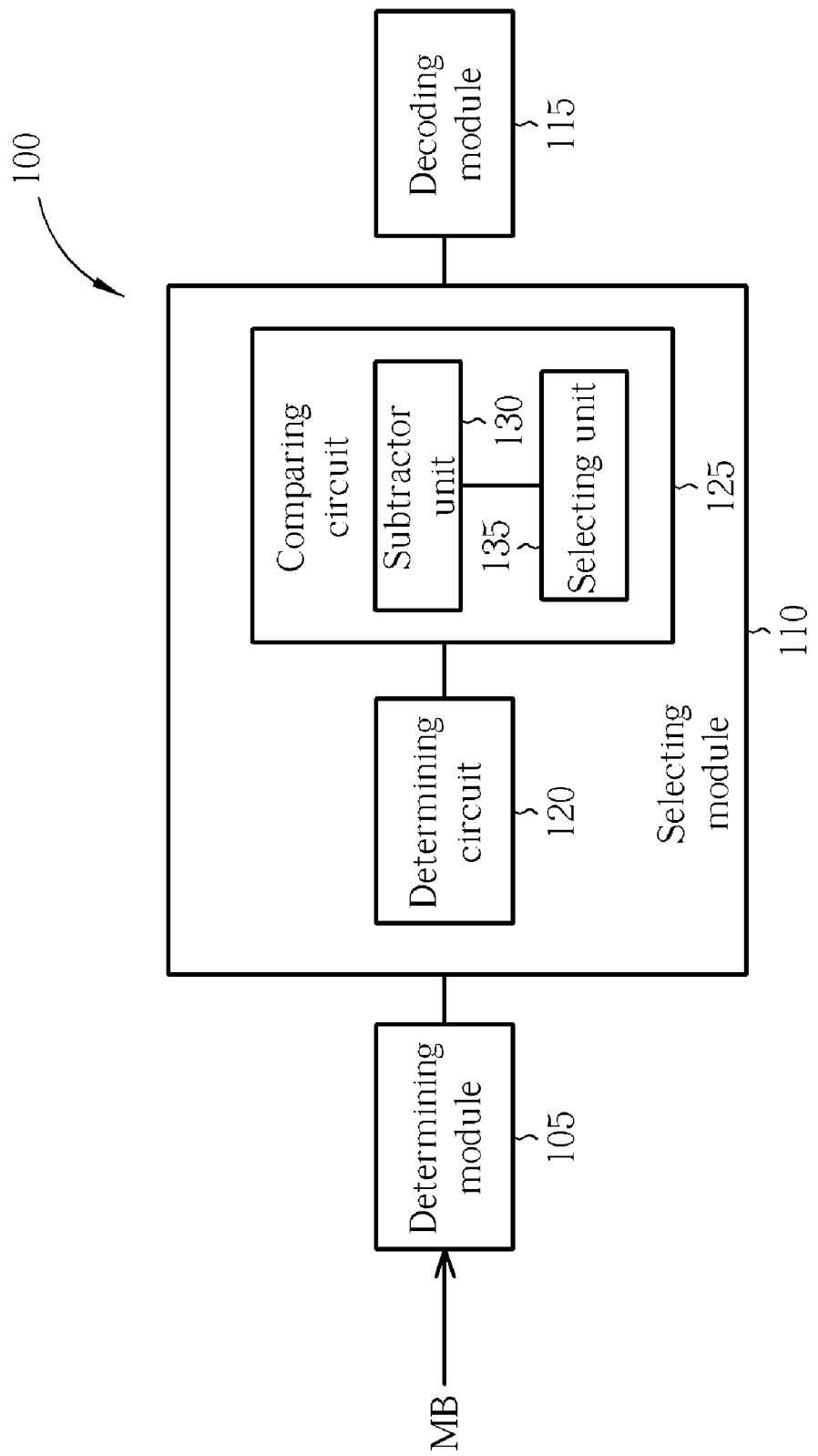
FIG. 1 is a diagram illustrating an apparatus of decoding video blocks according to one embodiment of the present invention.

Please refer to FIG. 1. FIG. 1 is a diagram of an apparatus 100 for decoding video blocks illustrated according to one embodiment of the present invention. As shown in FIG. 1, the apparatus 100 includes a determining module 105, a selecting module 110 and a decoding module 115, where the selecting module 110 includes a determining circuit 120 and a comparing circuit 125. The determining module 105 is used for determining whether different reference video pictures respectively corresponding to 2-direction motion vectors of the current video block MB to be decoded include at least an intra picture. When the reference video pictures include no intra picture, the selecting module 110 selects a motion vector from two motion vectors of the video block MB according to multiple reference areas, such as motion vectors corresponding to a plurality of video blocks in a first reference area $A_1$ and a second reference area $A_2$. The decoding module 115 then decodes the video block MB according to the selected motion vector. The determining module 105 firstly determines whether any of the reference video pictures referenced by the motion vectors of the video block MB is an intra picture, if one reference video picture (the previous reference video picture or the future reference video picture) is an intra picture, the apparatus 100 selects the motion vector corresponding to this intra picture directly without actuating the selecting module 110. As a result, the decoding module 115 uses the selected motion vector to perform the motion compensation for decoding the video block MB. The reason for directly using the motion vector corresponding to the intra picture for executing motion compensation is that the intra picture itself has higher picture accuracy. As there is no need to reference other video pictures when performing video decoding upon the video block MB, the motion vector corresponding to the intra picture can be directly utilized for motion compensation. However, provided that both reference video pictures are intra pictures, any of the motion vectors corresponding to the intra pictures is selected as these two reference video pictures both have higher frame accuracy. Next, the decoding module 115 uses the selected motion vector to decode the video block MB in the same way.

If neither reference video picture (previous reference video picture and future reference video picture) is an intra picture, the apparatus 100 enables the selecting module 110 to select a proper motion vector, and the decoding module 115 uses the selected motion vector to execute motion compensation for decoding the video block MB. The operation of the selecting module 110 is described as follows. The determining circuit 120 determines a first reference vector $V_1$ and a second reference vector $V_2$ according to the motion vectors corresponding to a plurality of video blocks respectively in the first reference area $A_1$ and the second reference area $A_2$. In this embodiment, the first reference area $A_1$ is the video picture where the video block MB is located (i.e. the first reference area $A_1$ can be the whole video picture), and the second reference area $A_2$ is a partial area of the video picture that contains the video block MB (the second reference area $A_2$ is not limited to be a partial area including the video block MB). In other embodiments, the second reference area $A_2$ can be a partial area of the video picture that does not include the video block MB. In other words, the size and location of the second reference area A2 are not limitations of the present invention. The determining circuit 120 can be realized by an adder unit such that the determining circuit 120 determines a first reference vector $V_1$ by executing a vector addition on the motion vectors corresponding to video blocks in the first reference area $A_1$ and determines a second reference vector $V_2$ by executing a vector addition on the motion vectors corresponding to video blocks in the second reference area $A_2$. The comparing circuit 125 includes a subtractor unit 130 and a selecting unit 135, wherein the subtractor unit 130 is used to calculate first judgment vectors $V_{J1}$ and $V_{J1}'$ by executing a vector subtraction respectively on the first reference vector $V_1$ and the two motion vectors associated with the video block MB, and is also used to calculate second judgment vectors $V_{J2}$ and $V_{J2}'$ by executing a vector subtraction respectively on the second reference vector $V_2$ and the two motion vectors associated with the video block MB. Then, the selecting unit 135 selects a target judgment vector with minimum magnitude from the first judgment vectors $V_{J1}$, $V_{J1}'$ and the second judgment vectors $V_{J2}$, $V_{J2}'$, and determines the motion vector utilized for decoding the video block MB according to the target judgment vector.

The aforementioned decoding scheme of the present invention is suitable for decoding video blocks at edges of the video picture, video regions covered by the user menu, the subpicture of a picture-in-picture (PIP) display, or any video regions not demanding high picture accuracy. For example, when decoding the video block within the subpicture, the decoding scheme disclosed by the present invention is used for avoiding consuming too much memory bandwidth. Furthermore, the system itself can determine whether to execute the decoding scheme of the present invention or not by checking if the memory bandwidth utilization exceeds a predetermined load.

Figure 2:
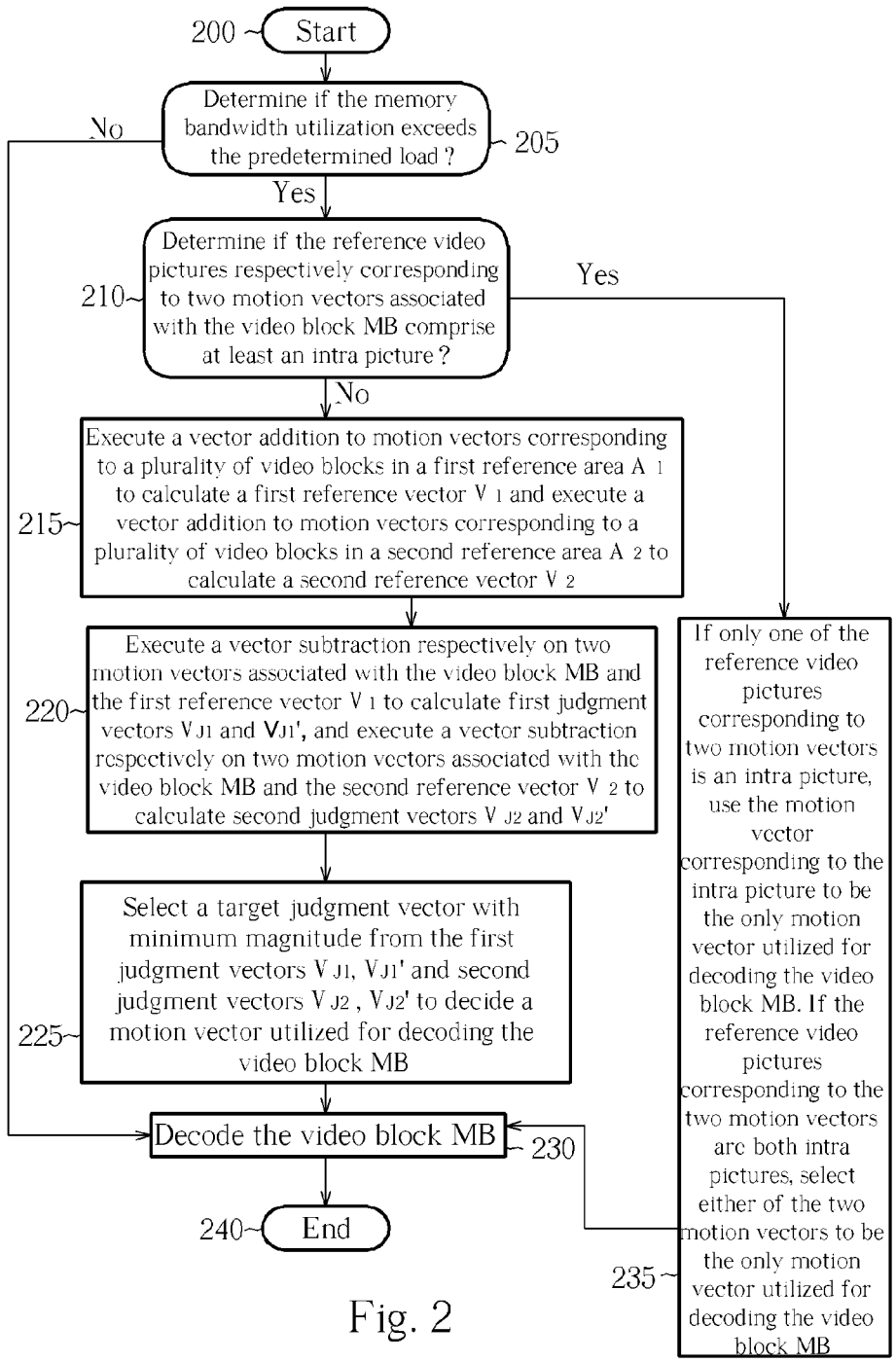
FIG. 2 is a flowchart illustrating a video block decoding operation performed by the apparatus shown in FIG. 1.

Please refer to FIG. 2. FIG. 2 is a flowchart illustrating a video block decoding operation performed by the apparatus 100 shown in FIG. 1. It should be noted that, if the same result is substantially achieved, the steps of the flowchart shown in FIG. 2 need not be in the exact order shown and need not be contiguous, that is, other steps can be intermediate. The detailed description of the steps is as below.

Step 200: Start.

Step 205: Determine if the memory bandwidth utilization exceeds the predetermined load. If yes, go to step 210; otherwise, go to step 230.

Step 210: Determine if the reference video pictures respectively corresponding to two motion vectors associated with the video block MB include at least an intra picture. If yes, go to step 230; otherwise, go to step 215.

Step 215: Execute a vector addition to motion vectors corresponding to a plurality of video blocks in a first reference area $A_1$ to calculate a first reference vector $V_1$ and execute a vector addition to motion vectors corresponding to a plurality of video blocks in a second reference area $A_2$ to calculate a second reference vector $V_2$.

Step 220: Execute a vector subtraction respectively on two motion vectors associated with the video block MB and the first reference vector $V_1$ to calculate first judgment vectors $V_{J1}$ and $V_{J1}'$, and execute a vector subtraction respectively on two motion vectors associated with the video block MB and the second reference vector $V_2$ to calculate second judgment vectors $V_{J2}$ and $V_{J2}'$.

Step 225: Select a target judgment vector with minimum magnitude from the first judgment vectors $V_{J1}$, $V_{J1}'$ and second judgment vectors $V_{J2}$, $V_{J2}'$ to decide a motion vector utilized for decoding the video block MB.

Step 230: Decode the video block MB, and then proceed to step 240.

Step 235: If only one of the reference video pictures corresponding to two motion vectors is an intra picture, use the motion vector corresponding to the intra picture to be the only motion vector utilized for decoding the video block MB. If the reference video pictures corresponding to the two motion vectors are both intra pictures, select either of the two motion vectors to be the only motion vector utilized for decoding the video block MB.

Step 240: End.

As mentioned above, the exemplary decoding scheme uses motion vectors of neighboring video blocks of the video block MB to be decoded and motion vectors of other video blocks in the same video picture to calculate the first reference vector $V_1$ and the second reference vector $V_2$, whereas the operation is based on characteristics of the video itself. For example, when motion vectors of most neighboring video blocks refer to a video block in a particular direction, it means that the present video picture is probably shot through a fixed camera lens (e.g. the present video picture is captured in a condition where people are moving but the background is unchanged). Therefore if only a motion vector can be selected to decode the motion block MB, selecting the motion vector pointing to the video block in the particular direction to decode the video block MB can get higher picture accuracy. On the other hand, when motion vectors of most video blocks in the whole video picture refer to a video block in a particular direction, it means that the present video picture is probably shot through a moving camera lens. Therefore, if only a motion vector can be selected to decode the motion block MB, selecting the motion vector pointing to the video block in the particular direction can achieve higher picture accuracy. Furthermore, because the first reference vector $V_1$ and the second reference vector $V_2$ are obtained by vector additions, the subtractor unit 130 is needed to calculate the above judgment vectors $V_{J1}$, $V_{J1}'$, $V_{J2}$ and $V_{J2}'$ after acquisition of the first reference vector $V_1$ and the second reference vector $V_2$. Due to the vector magnitude obtained by the vector subtraction being indicative of the distance between endpoints of two vectors before the vector subtraction is applied, selecting a target judgment vector with minimum magnitude and then using the motion vector corresponding to the target judgment vector in order to decode the motion block MB can achieve higher picture accuracy and solve the aforementioned problem of over-consuming memory bandwidth.

In another embodiment, the decoding scheme selects a motion vector from two motion vectors associated with the video block MB according to motion vectors corresponding to a plurality of video blocks within a single reference area (e.g. either the first reference area $A_1$ or the second reference area $A_2$). Although the picture accuracy of the decoded video block may be worse than that of the decoding result in the above embodiment, however, it can solve the problems of conventional decoding methods encountered, and is especially suitable for decoding video blocks at edges of a video picture, a covered area of an on-screen display (OSD), and a subpicture of picture-in-picture (PIP) display, or any video regions not demanding high picture accuracy. Additionally, in other embodiments, the determining module 105 shown in FIG. 1 is optional. Regardless of the reference video pictures being intra pictures or not, an optimum motion vector is always selected through the use of the selecting module 110. The memory bandwidth consumption can also be decreased. All alternative embodiments described above should fall within the scope of the present invention.

Please note that, for simplicity, the present invention takes the currently used MPEG specification as an example to illustrate technical features of the disclosed decoding scheme. However, the decoding scheme disclosed by the present invention can also be applied to other video coding standards. For example, in a specific video coding standard, such as the video coding standard H.264, the number of motion vectors associated with the video block to be decoded is likely to be more than two. Taking the video coding standard H.264 as an example, the number of motion vectors associated with the video block to be decoded can be as many as thirty-two, as a video block can contain 16 sub video blocks each producing two motion vectors. The decoding scheme of the present invention can select N motion vectors from M motion vectors (e.g. thirty-two motion vectors), where N is equal to or greater than M/2 (e.g. sixteen), that is, N motion vectors contain at least one of two motion vectors produced by each of M/2 sub video blocks for subsequent motion compensation. According to the description above, the action of selecting the smallest judgment vector is slightly modified to select the smaller N motion vectors for selecting N appropriate motion vectors. This alternative design also obeys the spirit of the present invention.

Those skilled in the art will readily observe that numerous modifications and alterations of the device and method may be made while retaining the teachings of the invention.

What is claimed is:

1. A method for decoding a video picture comprising at least a video block in a reference area, the method comprising:
   selecting a subset of N motion vectors from a plurality of M motion vectors of the video blocks in the reference area, wherein selecting N motion vectors from M motion vectors comprises comparing the reference vector with the M motion vectors to select the N motion vectors by:
   executing a vector subtraction on the reference vector and the M motion vectors respectively to calculate M judgment vectors;
   selecting N judgment vectors that are smaller in magnitude than the M judgment vectors; and
   determining N motion vectors according to the N judgment vectors; and decoding the video blocks according to the N motion vectors.

2. The method of claim 1, wherein the M motion vectors are produced according to M/2 sub video blocks, each producing two motion vectors and the N motion vectors comprise at least one of the two motion vectors produced by each of the M/2 sub video blocks, N is less than M and an integer greater than or equal to 2.

3. The method of claim 1, wherein selecting N motion vectors from M motion vectors comprises:
   determining a reference vector according to the motion vectors corresponding to the video blocks in the reference area.

4. The method of claim 3, wherein determining the reference vector comprises:
   executing a vector addition to the motion vectors corresponding to the video blocks to calculate the reference vector.

5. The method of claim 3, wherein the reference area is the total video picture or a partial area of the video picture.

6. The method of claim 1, wherein selecting N motion vectors from M motion vectors comprises:
   determining a first reference vector according to motion vectors corresponding to a plurality of video blocks in a first reference area;
   determining a second reference vector according to motion vectors corresponding to a plurality of video blocks in a second reference area; and
   comparing the first and second reference vectors and the M motion vectors to select the N motion vectors.

7. The method of claim 6, wherein determining the first reference vector comprises executing a vector addition on the motion vectors corresponding to the video blocks in the first reference area to calculate the first reference vector; and wherein determining the second reference vector comprises executing a vector addition on the motion vectors corresponding to the video blocks in the second reference area to calculate the second reference vector.

8. The method of claim 6, wherein comparing the first and second reference vectors comprises:
   executing a vector subtraction on the first reference vector and the M motion vectors respectively to calculate M first judgment vectors;
   executing a vector subtraction on the second reference vector and the M motion vectors respectively to calculate M second judgment vectors; and
   selecting N judgment vectors that are smaller in magnitude from the M first judgment vectors and the M second judgment vectors, and determining the N motion vectors according to the N judgment vectors.

9. The method of claim 8, wherein the M first judgment vectors and the M second judgment vectors are produced according to M/2 sub video blocks each producing two first judgment vectors and two second judgment vectors, and the N judgment vectors comprise at least one of the two first judgment vectors and the two second judgment vectors produced by each of the M/2 sub video blocks.

10. The method of claim 6, wherein the first reference area is the whole video picture, and the second reference area is a partial area of the video picture.

11. The method of claim 1, further comprising:
    determining if a plurality of reference video pictures, referred to by the M motion vectors corresponding to the video block, comprise at least an intra picture; and
    when the reference video pictures comprise at least an intra picture, selecting a motion vector produced by one intra picture of the reference video pictures to decode the video block.

12. An apparatus for decoding a video picture comprising at least a video block in a reference area, the apparatus comprising:
    a selecting module, for selecting a subset N motion vectors from a plurality of M motion vectors of the video blocks in the reference area, wherein the selecting module comprises a comparing circuit coupled to the determining circuit for comparing the reference vector with the M motion vectors to select the N motion vectors, wherein the comparing circuit comprises:
        a subtractor unit, for executing a vector subtraction to the reference vector and the M motion vectors respectively to calculate M judgment vectors; and
        a selecting unit coupled to the subtractor unit for selecting N judgment vectors that are smaller in magnitude from the M judgment vectors and determining the N motion vectors according to the N judgment vectors; and
    a decoding module, coupled to the selecting module, for decoding the video blocks according to the N motion vectors, wherein M and N are greater than 1.

13. The apparatus of claim 12, wherein the M motion vectors are produced according to M/2 sub video blocks, each producing two motion vectors and the N motion vectors comprise at least one of the two motion vectors produced by each of the M/2 sub video blocks, N is less than M and an integer greater than or equal to 2.

14. The apparatus of claim 12, wherein the selecting module comprises:
    a determining circuit, for determining a reference vector according to the motion vectors corresponding to the video blocks in the reference area.

15. The apparatus of claim 14, wherein the determining circuit comprises:
    an adder unit, for executing a vector addition to the motion vectors corresponding to the video blocks to calculate the reference vector.

16. The apparatus of claim 14, wherein the reference area is the total video picture or a partial area of the video picture.

17. The apparatus of claim 12, wherein the selecting module comprises:
    a determining circuit, for determining a first reference vector according to motion vectors corresponding to a plurality of video blocks in a first reference area, and determining a second reference vector according to motion vectors corresponding to a plurality of video blocks in a second reference area; and
    a comparing circuit, coupled to the determining circuit, for comparing the first and second reference vectors and the M motion vectors to select the N motion vector.

18. The apparatus of claim 17, wherein the determining circuit comprises:
    an adder unit, for executing a vector addition on the motion vectors corresponding to the video blocks in the first reference area to calculate the first reference vector, and for executing a vector addition on the motion vectors corresponding to the video blocks in the second reference area to calculate the second reference vector.

19. The apparatus of claim 17, wherein the comparing circuit comprises:
    a subtractor unit, for executing a vector subtraction on the first reference vector and the M motion vectors respectively to calculate M first judgment vectors, and for executing a vector subtraction on the second reference vector and the M motion vectors respectively to calculate M second judgment vectors; and
    a selecting unit, coupled to the subtractor unit, for selecting N judgment vectors that are smaller in magnitude from the M first judgment vectors and the M second judgment vectors, and determining the N motion vectors according to the N judgment vectors.

20. The apparatus of claim 19, wherein the M first judgment vectors and the M second judgment vectors are produced according to M/2 sub video blocks each producing two first judgment vectors and two second judgment vectors, and the N judgment vectors comprise at least one of the two first judgment vectors and the two second judgment vectors produced by each of the M/2 sub video blocks.

21. The apparatus of claim 17, wherein the first reference area is the whole video picture, and the second reference area is a partial area of the video picture.

22. The apparatus of claim 12, further comprising:
    a determining module, for determining if a plurality of reference video pictures, referred to by the M motion vectors corresponding to the video block, comprise at least an intra picture;
    wherein when the reference video pictures comprise at least an intra picture, the selecting module selects a motion vector produced by one intra picture of the reference video pictures for decoding the video block.

23. A method for decoding a video picture comprising at least a video block in a reference area, the method comprising:
    selecting a subset of motion vectors from a plurality of motion vectors of the video blocks in the reference area, wherein selecting the subset of motion vectors comprises comparing the reference vector with the plurality of motion vectors to select the subset of motion vectors by:
        executing a vector subtraction on the reference vector and the plurality of motion vectors respectively to calculate a plurality of judgment vectors;
        selecting a subset of judgment vectors from the plurality of judgment vectors; and
        determining the subset of motion vectors according to the subset of judgment vectors; and
    decoding the video blocks according to the subset of motion vectors.

* * * * *